United States Patent Office 3,838,118
Patented Sept. 24, 1974

3,838,118
[(THIOXANTHENYL)PROPYL]-PIPERIDYL-
BENZIMIDAZOLINONES
Willem Soudijn, Turnhout, Ineke van Wijngaarden,
Beerse, and Paul Adriaan Jan Janssen, Vosselaar, Belgium, assignors to Janssen Pharmaceutica N.V.
No Drawing. Filed Feb. 20, 1973, Ser. No. 333,859
Int. Cl. C07d 29/28
U.S. Cl. 260—240 TC                    3 Claims

ABSTRACT OF THE DISCLOSURE

The compounds, 1-{1-[3-(9-thioxanthenyl)propyl]-4-piperidyl}-2-benzimidazolinone and 1-{1-[3-(9-thioxanthenylidene)propyl] - 4 - piperidyl}-2-benzimidazolinone, useful as neuroleptic agents.

DESCRIPTION OF THE INVENTION

This invention relates to novel benzimidazolinone derivatives, namely, 1 - {1-[3 - (9-thioxanthenyl)propyl]-4-piperidyl}-2-benzimidazolinone, having the formula:

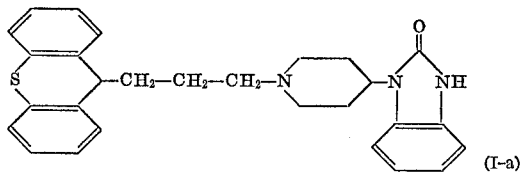

(I-a)

including the therapeutically active non-toxic acid addition salts thereof, and 1-{1-[3-(9-thioxanthenylidene)-propyl] - 4 - piperidyl}-2-benzimidazolinone, having the formula:

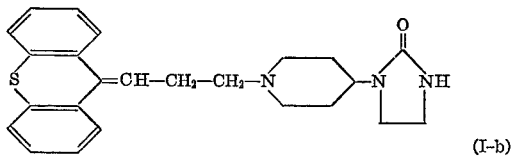

(I-b)

The compounds of formula (I–a) and (I–b) are prepared by reacting the respective compounds of formulas (II–a) and (II–b), wherein X is a reactive ester of the corresponding alcohol, e.g. chloro, bromo, mesylate, tosylate, and the like, preferably chloro or bromo, with 1-(4-piperidyl)-2-benzimidazolinone (III). This condensation reaction is conveniently conducted in an inert organic solvent such as, for example, an aromatic hydrocarbon, e.g., benzene, toluene, xylene and the like; a lower alkanol, e.g., methanol, ethanol, n-butanol, and the like; a ketone, e.g., 4-methyl-2-pentanone, butanone, and the like; an ether, e.g., dioxane, diethyl ether and the like; dimethylformamide (DMF); nitrobenzene; and the like. The addition of an acid acceptor, i.e., an appropriate base such as, for example, an alkali metal carbonate or bicarbonate, or an organic tertiary amine such as for example, a trialkylamine, e.g., triethylamine, tributylamine and the like, or a heterocyclic amine, e.g., pyridine, quinoline and the like, may be utilized to bind the acid that is liberated during the course of the reaction. The amount of acid acceptor that may be employed is not critical, but, for optimum conditions, the theoretical number of moles of liberated acid can easily be calculated from the quantities of reactants employed and, thus, the corresponding amount of acid acceptor that need be employed can readily be determined. When X is halo, the presence of catalytic amounts of potassium iodide is also desirable. Elevated temperatures may be employed to enhance the rate of reaction.

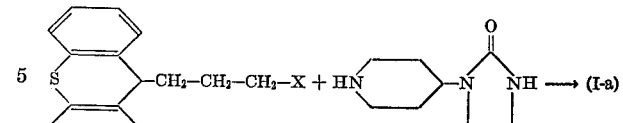

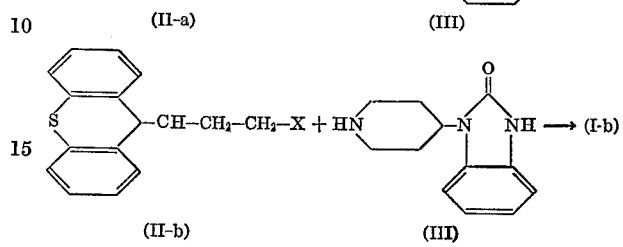

The compounds of formulas (I–a) and (I–b) may be converted to the therapeutically active non-toxic acid addition salt form by treatment with an appropriate acid, such as, for example, an inorganic acid, such as a hydrohalic acid, e.g., hydrochloric, hydrogromic and the like, and sulfonic acid, nitric acid, phosphoric acid and the like; or an organic acid, such as, for example, acetic, propionic, glycolic, lactic, pyruvic, malonic, succinic, maleic, fumaric, malic, tartaric, citric, benzoic, cinnamic, mandelic, methanesulfonic, ethanesulfonic, benzenesulfonic, p-toluenesulfonic, cyclohexanesulfamic, salicyclic, p-aminosalicylic and the like acids. Conversely, the salt form can be converted by treatment with alkali into the free base form.

The subject compounds and the therapeutically active acid addition salts thereof have been found to possess central nervous system (CNS) depressant activity similar to the neuroleptic activity of butyrophenones, for example, haloperiodol.

A characterization of neuroleptic drugs is their ability to antagonize amphetamine-induced CNS-stimulation. In the amphetamine antagonism test, male Wistar rats are preterated with an oral dose of the compound to be tested and challenged one hour thereafter with a standard dose of amphetamine (5 mg./kg. i.v.). In untreated animals, the standard dose of amphetamine will induce typical CNS-stimulation, e.g., agitation and stereotyped chewing. These phenomena are antagonized by neuroleptic agents, and, with the subject compounds, such antagonism is generally observed at oral dose levels ranging from about 0.05 to about 5.0 mg./kg. For example, the oral dose level at which the two compounds of Examples I and III protect the rats against the amphetamine-induced agitation and chewing has been found to be 0.63 mg./kg. for each compound.

Neuroleptic agents are also known to block apomorphine-induced vomiting in dogs. In the anti-apomorphine test [see "Method 1" in Janssen, P.A.J. et al., Arzneim.-Forsch., 15, 1196 (1965)], the compound to be tested is given orally followed at different time intervals thereafter by the standard dose of apomorphine (0.31 mg./kg. s.c.) which will induce vomiting in untreated dogs. Anti-apomorphine activity is demonstrated with the subject compounds in base or salt form at oral dose levels as low as 0.005 mg./kg. and at $ED_{50}$ values of about 0.02–2.0 mg./kg. orally. The $ED_{50}$ value (in mg./kg.) is the oral dose level of the tested compound protecting 50% of the animals from emesis. For example, the compound of Example III has been found to have an $ED_{50}$ of 0.45 mg./kg. in this test with a duration of 25 hours.

The following examples are intended to illustrate, but not to limit, the scope of the present invention. Unless otherwise stated, all parts are by weight.

EXAMPLE I

A mixture of 1.54 parts of 9-(3-chloropropyl)-thioxanthene, 1.09 parts of 1-(4-piperidyl)-2-benzimidazolinone, 0.8 parts of anhydrous sodium carbonate, 0.01 parts of potassium iodide and 7.5 parts of dimethylformamide is stirred for 20 hours while heating in an oil-bath at 105° C. The reaction mixture is filtered over hyflo and upon the addition of water to the filtrate, the product, 1-{1-[3-(9-thioxanthenyl)propyl] - 4-piperidyl}-2-benzimidazolinone, is precipitated.. It is filtered off, washed with water, dried and crystallized twice: first from ethyl aceate and then from ethanol, yielding 1-{1-[3-(9-thioxanthenyl)propyl]-4-piperidyl} - 2 - benzimidazolinone hydrate; m.p. 211.1° C.

EXAMPLE II

The product of Example I is treated with ethanolic HCl in the standard manner to produce the corresponding hydrochloride acid addition salt. In turn, the latter, when treated with alkali (e.g., aqueous NaOH), yields the product in the base form.

EXAMPLE III

A mixture of 1.4 parts of 9-(3-bromo-1-propenyl)-thioxanthene, 0.87 parts of 1-(4-piperidyl)-2-benzimidazolinone, 0.64 parts of anhydrous sodium carbonate and 6 parts of dimethylformamide is stirred for 3 hours at 110° C. The reaction mixture is cooled, filtered over hyflo and the filtrate is diluted with water, whereupon the product, 1-{1-[3-(9 - thioxanthenylidene)propyl]-4-piperidyl}-2-benzimidazolinone, is crystallized. It is filtered off and recrystallized from acetone, yielding 1-{1-[3-(9-thioxanthenylidene)propyl] - 4-piperidyl}-2 - benzimidazolinone hydrate; m.p. 145–154° C. (dec.).

We claim:

1. A chemical compound selected from the group consisting of 1-{1-[3-(9-thioxanthenyl)propyl]-4-piperidyl}-2-benzimidazolinone and the therapeutically active acid addition salts thereof; and 1-{1-[3-(9-thioxanthenylidene)propyl]-4-piperidyl}-2-benzimidazolinone.

2. 1-{1-[3-(9-thioxanthenyl(propyl] - 4 - piperidyl}-2-benzimidazolinone hydrate.

3. 1-{1-[3-(9-thioxanthenylidene)propyl] - 4-pyridyl}-2-benzimidazolinone hydrate.

References Cited

UNITED STATES PATENTS

| 3,046,283 | 7/1962 | Engelhardt | 260—240 TC X |
| 3,047,580 | 7/1962 | Sprague | 260—240 TC X |
| 3,196,157 | 7/1965 | Janssen | 260—294.8 C |
| 3,629,267 | 12/1971 | Kaiser et al. | 260—294.8 C |

OTHER REFERENCES

Chemical Abstracts, vol. 65, cols. 722 to 723 (1966) (Abstracts of Belgian Pats. 663,432 and 663,433).

JOHN D. RANDOLPH, Primary Examiner

U.S. Cl. X.R.

424—267; 260—293.57